United States Patent [19]

Mastner

[11] Patent Number: 4,628,430
[45] Date of Patent: Dec. 9, 1986

[54] SWITCHING POWER-SUPPLY UNIT WITH IMPROVED START-UP BEHAVIOR

[75] Inventor: Georg Mastner, Niederrohrdorf, Switzerland

[73] Assignee: BBC Brown, Boveri & Company, Limited, Baden, Switzerland

[21] Appl. No.: 582,484

[22] Filed: Feb. 22, 1984

[30] Foreign Application Priority Data

Feb. 28, 1983 [CH] Switzerland .......................... 1088/83

[51] Int. Cl.$^4$ .............................................. G05F 1/56
[52] U.S. Cl. ..................................... 363/25; 323/286; 363/48
[58] Field of Search ............... 323/282, 284, 285, 286, 323/287, 901, 908, 351; 363/21, 25, 26, 39, 41, 45–47, 48, 49; 361/58, 111, 113, 6, 8, 10, 13, 88; 333/12

[56] References Cited

U.S. PATENT DOCUMENTS

| | | | |
|---|---|---|---|
| 1,878,101 | 9/1932 | Bradbury | 363/47 |
| 3,308,311 | 3/1967 | Swanson | 363/47 |
| 3,890,557 | 6/1975 | Bogdanov et al. | 363/48 |
| 4,488,200 | 12/1984 | Matsuzaki | 361/18 |

FOREIGN PATENT DOCUMENTS

| | | | |
|---|---|---|---|
| 1041268 | 4/1964 | United Kingdom | 363/98 |
| 435511 | 12/1974 | U.S.S.R. | 323/285 |
| 691816 | 6/1977 | U.S.S.R. | 323/282 |
| 781792 | 11/1980 | U.S.S.R. | 323/282 |

OTHER PUBLICATIONS

"International Semiconductor Data Book 1981, Unitrode Corp.", pp. 731–733.
Tietze et al., "Halbleiter-Schaltungstechnik", 5th ed., Springer-Verlag, 1980, pp. 391–394.

Primary Examiner—Patrick R. Salce
Assistant Examiner—D. Rebsch
Attorney, Agent, or Firm—Burns, Doane, Swecker & Mathis

[57] ABSTRACT

The voltage present at an input is chopped by a switch which is actuated by a pulse-width modulator controlled by the output voltage and is smoothed at least by a low-pass filter, consisting of an inductance and a capacitance, at the output. In order to reduce to a minimum the delay between the time an input voltage is applied and the time a rated value is at least approximately reached by the output voltage, the inductance is bypassed by a bypassing circuit which has a low inductance and which conducts if the output voltage is below a minimum voltage and in other cases is turned off. It contains, for example, a switch which is constructed as a switchable current source and which is actuated by a comparator comparing the output voltage with a reference voltage. In transformer-coupled embodiments, isolation between the output and the input is possible. The supply unit is suited, for example for supplying auxiliary devices of an instrument transformer from the current of the power-line to be monitored.

13 Claims, 4 Drawing Figures

SWITCHING POWER-SUPPLY UNIT WITH IMPROVED START-UP BEHAVIOR

BACKGROUND OF THE INVENTION

The present invention relates to a switching power-supply unit with a DC-voltage input, which unit contains a pulse-width modulator controlled by the output voltage and at least one switch, actuated by the pulse-width modulator, and, at its output side, a low-pass filter including of an inductance and a capacitance. In this arrangement, a DC-voltage applied to the input is chopped by the switch and the AC-voltage generated in this manner is smoothed out by the low-pass filter at the output. The pulse-width modulator is controlled by feedback in such a manner that the output voltage approximately maintains a pre-set rated value.

Such switching power-supply units are used in order to efficiently generate a constant DC-voltage which is suitable, for example for powering of electronic units from a possibly fluctuating DC-voltage source.

A switching power-supply unit (Buck-type regulator) of this general type is known (International Semiconductor Databook 1981, pp. 731–733 by Unitrode Corporation or U. Tietze, Ch. Schenk: Halbleiter-Schaltungstechnik, 5th edition, pp. 391–394, Springer-Verlag 1980), in which a switch actuated by the pulse-width modulator is located between the input and the low-pass filter, and the input of the low-pass filter is connected to zero, for example ground, through a free-wheeling diode.

Furthermore, a switching power-supply unit of this type is known (International Semiconductor Databook 1981, pp. 733, 734) which contains a transformer having a symmetrical primary and secondary winding, the center tap of the primary winding being connected to a DC-voltage input and the outer connections each being connected by a switch, actuated by the pulse-width modulator, to ground and the secondary winding, in conjunction with two diodes, forming a full-wave rectifier the output of which is connected to the input of the low-pass filter.

In such switching power-supply units, the inductance of the low-pass filter limits the rate of rise of the current to a maximum value permissible for the correct operation of the circuit. If an input voltage is applied to the de-energized supply unit, the current through the inductance rises only slowly and the capacitance of the low-pass filter is charged at a correspondingly slow rate; thus there is a considerably delay before the output voltage reaches its rated value. The lower the frequency of the chopper and the greater the dynamic range of the load current which has to be covered with the prescribed constant value of output voltage and the larger consequently the values of the components of the low-pass filter, the greater is this delay.

Further symmetric chopper circuits are known which work with a constant duty-cycle and where only a capacitor is connected to the output of the full-wave rectifier for smoothing the output voltage. These choppers do not exhibit a voltage-regulator effect. The output voltage is proportional to the input voltage, the proportionality constant approximately equal to the ratio between the number of secondary turns to the number of primary turns on the transformer. When the input voltage is switched on, the capacitor at the output is rapidly charged; the rate of charging is determined only by ohmic resistances of the transformer windings and of the electronic switch in conjunction with the dimensioning of the capacitor.

None of these circuits are suitable for applications, where, apart from the voltage-regulator effect, it is also required that the rated value of the output voltage should be reached as rapidly as possible after the input voltage has been applied.

One case of application in which such requirements occur is, for example, that of supplying units for monitoring a power-line (for example instrument transformers) or auxiliary devices of such units powered from the current of the line to be monitored.

OBJECTS AND SUMMARY OF THE INVENTION

It is intended to improve this condition by means of the invention. The present invention achieves the objective of creating a switching power-supply unit of the same class in which the output voltage at least approximately reaches its rated value with very little delay after an input voltage has been applied.

The objectives of the invention are essentially achieved by bypassing the inductance of the low-pass filter in a switching power-supply unit of this class with a bypassing circuit, the impedance of which has an inductive component which is low in comparison with the inductance of the low-pass filter and which conducts if the output voltage is below a minimum value which is not higher than the rated value of the output voltage, and in other cases does not conduct. This causes the capacitance of the low-pass filter to be quickly charged by a rapidly rising, high charging current immediately after an input voltage has been applied, until the selected minimum value of the output voltage is reached. As soon as sufficient current flows through the inductance of the low-pass filter for maintaining this minimum value, the bypassing circuit ceases to conduct.

BRIEF DESCRIPTION OF THE DRAWINGS

Preferred embodiments of the invention are illustrated in the accompanying drawings, in which:

In FIG. 1 a switching power-supply unit is shown which, in its basic construction, contains a pulse-width modulator 1 of the commercially available type (for example SG 1225A by Silicon General) which, controlled by the output voltage, actuates a switch 2 at the input 3 which is followed at the output by a low-pass filter consisting of an inductance 5 located between the switch 2 and the output 4 and of a capacitance 6 located between the output 4 and ground. The input of the low-pass filter is connected to ground via a free-wheeling diode 7.

Figure 1:
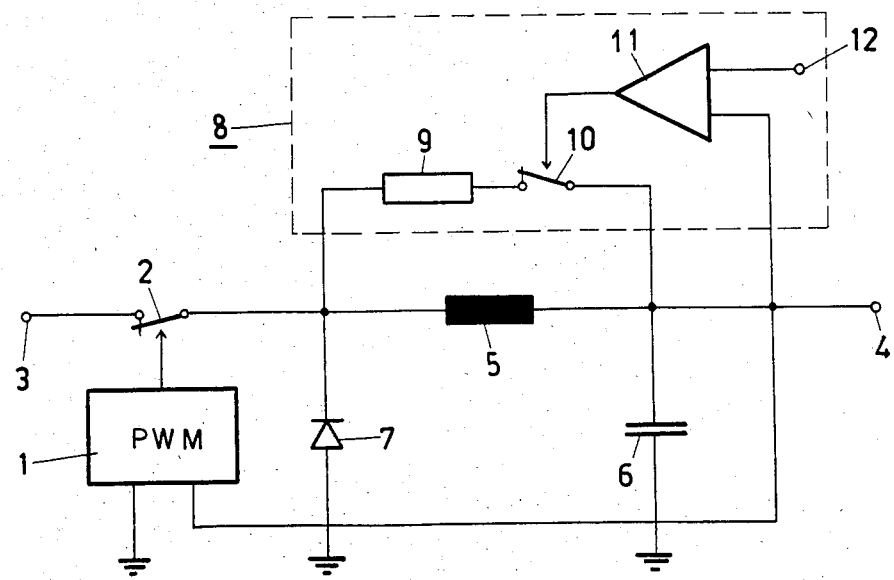
FIG. 1 shows the circuit diagram of a first embodiment of a DC-to-DC convertor according to the invention.

According to the invention, the inductance 5 is bypassed by a bypassing circuit 8. This circuit contains an impedance which, in its simplest embodiment, is constructed as a resistance 9 and a switch 10, which is actuated by a comparator 11 that compares the output voltage with a reference voltage applied to the reference input 12.

In normal operation, that is when the output voltage is above a minimum value, the bypassing circuit 8 is not conducting. Under the control of the pulse-width modulator 1, the switch 2 periodically opens for the duration of an interval, the length of which in each case depends on the input and the output voltage. During the interval in which the input voltage is switched through to the low-pass filter, the current through the inductance 5 rises, since the input voltage is higher than the output voltage and the diode 7 is cut off. If the switch 2 is open, a decreasing current flows through the diode 7 and the inductance 5, since the output voltage is higher than the voltage present at the input of the low-pass filter. The output voltage is smoothed by the capacitance 6.

If an input voltage is applied to the de-energized supply unit, the comparator 11 is activated and compares the output voltage with a reference voltage. Since the former is far below the minimum value, the comparator closes the switch 10, whereupon a high current flows through the resistance 9, which limits the current to the extent that an overloading of the switch 10 is prevented, which current charges the capacitance 5 until the output voltage has reached the minimum value, whereupon the comparator 11 opens the switch 10. As soon as sufficient current flows through the inductance 5 for maintaining the output voltage above the minimum value, the bypassing circuit 8 stays turned-off and the supply unit operates in normal mode. The minimum value of the output voltage, which is the threshold below which the bypassing circuit 8 will conduct, is determined in accordance with the application-related voltage stability requirements. In most cases 80% of the rated value should be adequate.

Figure 2:
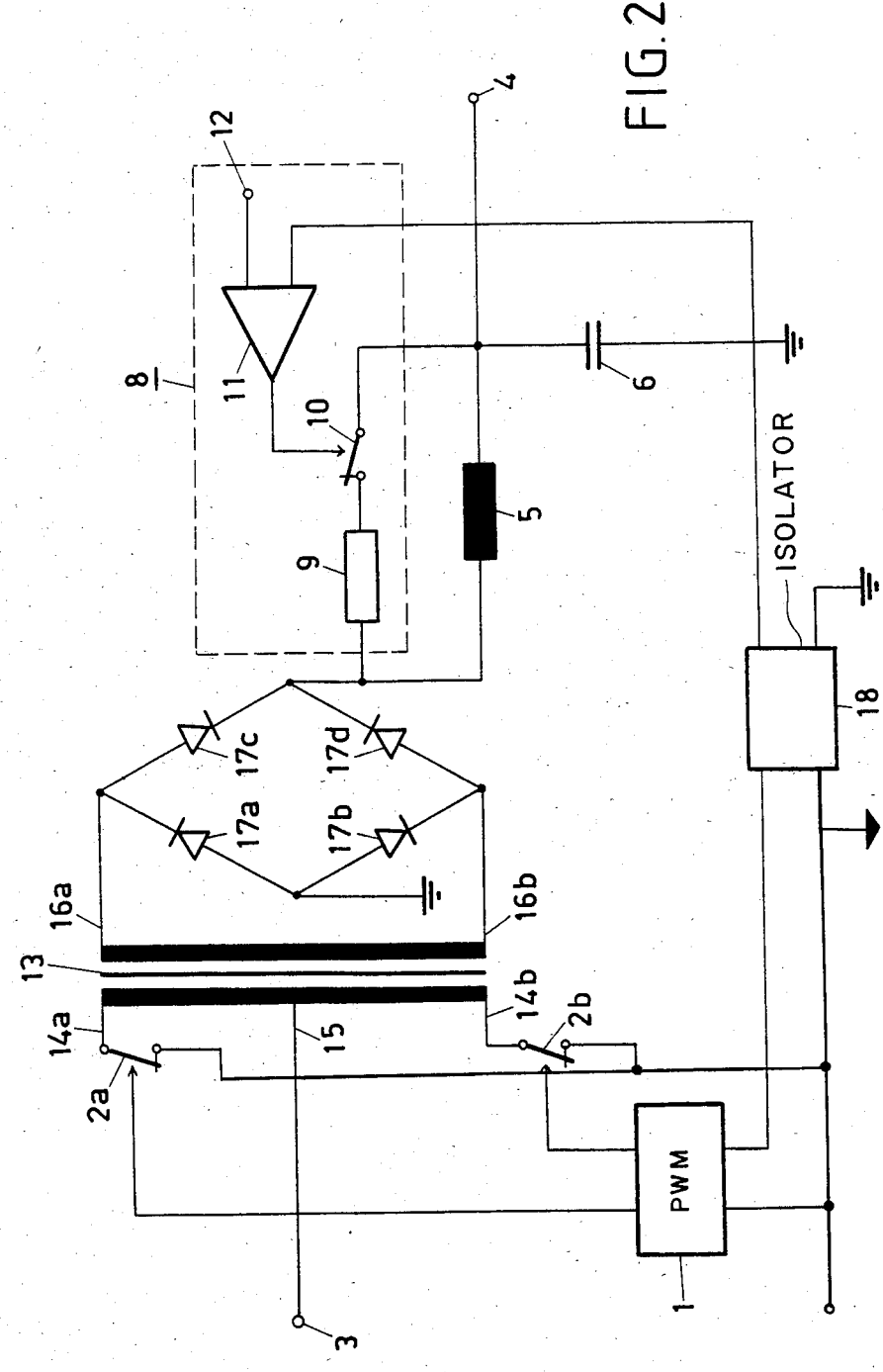
FIG. 2 shows the circuit diagram of a second embodiment of a DC-to-DC convertor according to the invention.

FIG. 2 shows a transformer-coupled switching power-supply unit with a push-pull circuit and isolation of input and output. The center tap 15 of the symmetric primary winding of the transformer 13 is connected to the DC-voltage input 3, the outer connections 14a, 14b of the primary winding are alternately connected by electronic switch 2a and 2b to the zero point of the primary circuit. A pulse-width modulator 1 controls the closing times of these switches 2a, 2b as a function of the voltage at output 4, or as a function of a voltage which is proportional to the output voltage, respectively. On the secondary side, an arrangement consisting of the secondary winding having connections 16a, 16b and the diodes 17a, 17b, 17c and 17d forms a full-wave rectifier, the output of which is connected to the input of a low-pass filter consisting of the inductance 5 and the capacitor 6. This filter then forms the average of the pulse-width modulated voltage at the output of the rectifier. The feedback from the output 4 to the pulse-width modulator 1 is established by isolating transmission means 18, for example an isolation amplifier.

According to the invention, the power-supply unit again has a bypassing circuit 8 consisting of an impedance, in the simplest case a resistance 9 and a switch 10, actuated by a comparator 11, which circuit bypasses the inductance 5, the comparator 11 again comparing the output voltage with a reference voltage applied to its reference input 12.

When an input voltage is applied to the de-energized supply unit, the capacitance 6 is again charged through the bypassing circuit 8 until the output voltage has reached the minimum value. In normal operation, the bypassing circuit 8 is not conducting.

In both embodiments, it is of advantage to construct the switch 10 in the bypassing circuit 8 as a switchable constant-current source, since in this manner the current can be given an optimum value largely independent of the voltage drop across the bypassing circuit.

Figure 3:
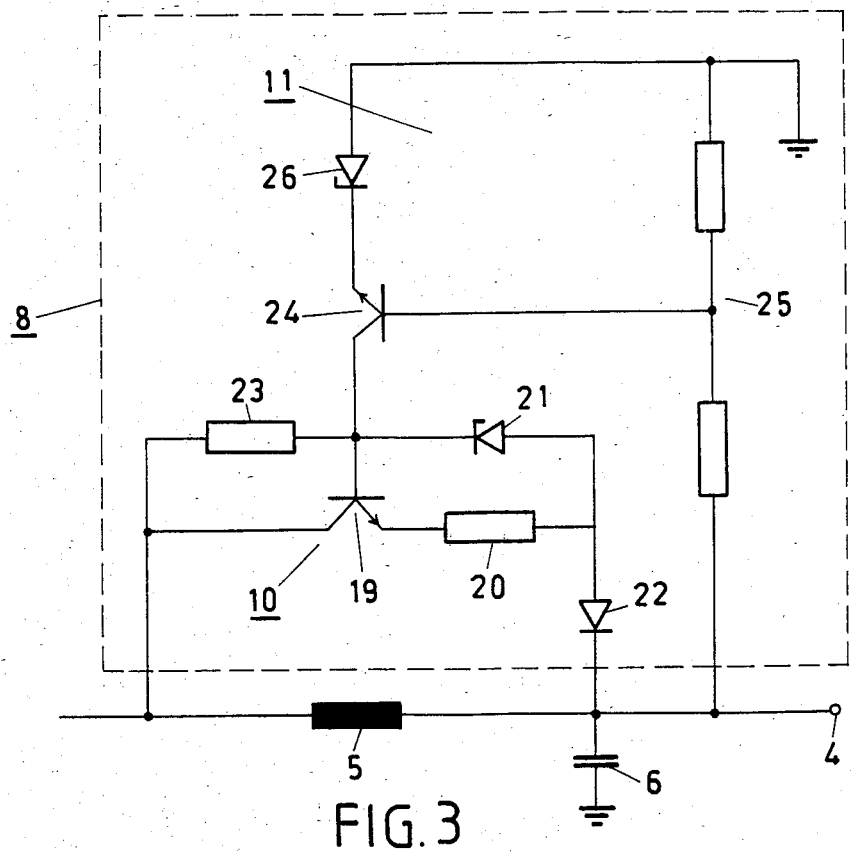
FIG. 3 shows an illustrative embodiment of the bypassing circuit in the form of a current source.

FIG. 3 shows an illustrative embodiment of the bypassing circuit 8 for a positive voltage polarity, having a switchable constant current source and the low-pass filter feeding the output 4 of a DC-to-DC converter according to the invention with the bypassed inductance 5 and the capacitance 6. The constant-current source of known type is formed by a transistor 19, an emitter resistance 20, a Zener diode 21 and a base-collector resistance 23. The value of the current is determined by the Zener diode voltage and the emitter resistance 20. The emitter output of the current source is connected to the output of the filter through a diode 22. The diode 22 prevents the current source from being reversed in polarity during the time interval in which the output voltage of the rectifier is zero because of pulse-width modulation and the voltage at the output 4 has a positive value. The comparator 11 contains a second transistor 24 and a voltage divider 25, which is connected between the output voltage and ground, and which drives the transistor 24, the collector of which is connected to the base of the transistor 19 and its emitter is grounded via a Zener diode 26.

If the output voltage is low, the voltage at the base of the transistor 24 is lower than the sum of the base-emitter voltage of the transistor 24 and of the breakthrough voltage of the Zener diode 26. The transistor 24 is cut off and the transistor 19 conducts. If the output voltage reaches the minimum value, the voltage at the base of the transistor 24 increases to such a value that this transistor and the Zener diode 26 used as reference voltage source begin to conduct. The base voltage at the transistor 19 drops and it is cut off. This embodiment of the bypassing circuit 8 is particularly simple and reliable.

Figure 4:
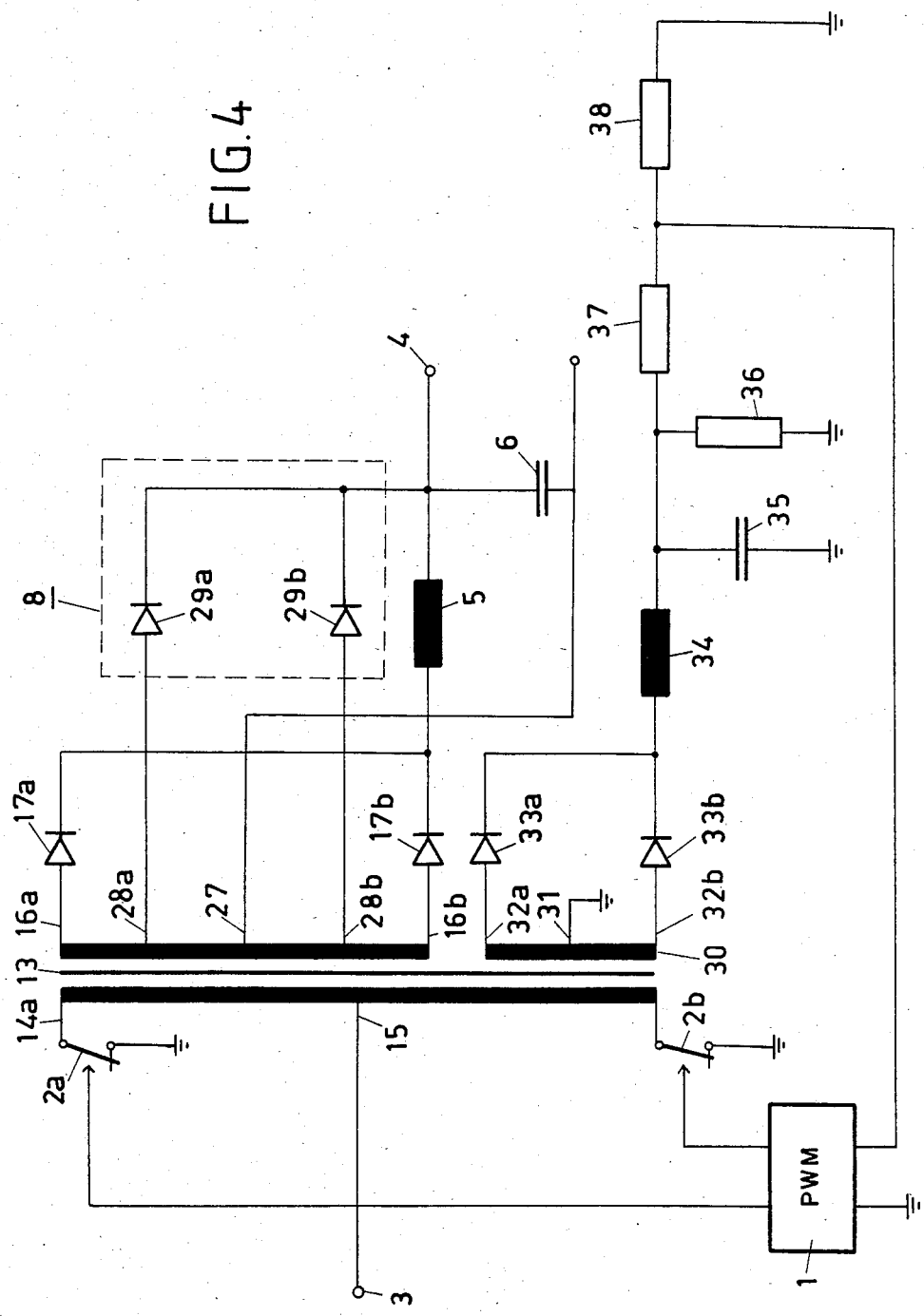
FIG. 4 shows the circuit diagram of a third embodiment of a DC- to DC convertor according to the invention.

In FIG. 4, a switching power-supply unit is shown the basic construction of which corresponds to that of the power-supply unit explained in connection with FIG. 2 except that the transformer 13 also has a center tap 27 which permits the full-wave rectifier to be constructed with only two diodes 17a, 17b.

According to the invention, the secondary winding of the transformer 13 has two further taps 28a, 28b which in each case branch off, preferably symmetrically with respect to each other, between the center tap 18 and one of the outer connections 16a or 16b, respectively, the bypassing circuit 8 consisting of two diodes 29a, 29b via each one of which one of the taps 28a, 28b is connected to the output 4. Under normal conditions of operation, the voltage between the taps 28a, 28b is a fraction of the voltage between the connections 16a, 16b as given by the relative number of turns between the respective connections. In normal operation, therefore, the voltage supplied by the latter, rectified by the diodes 17a, 17b and smoothed by the inductance 5 is higher than that supplied by the taps 28a, 28b and rectified by the diodes 29a, 29b and the latter are cut off. However, if an input voltage is applied to the de-energized supply unit, first a high voltage drop is created across the inductance 5 because of its retarding action on the current increase and the capacitance 6 is rapidly charged through the diodes 29a, 29b. In order to achieve DC-isolation between the input 3 and the output 4, the output voltage is simulated at least approximately by the following circuit: a secondary auxiliary winding 30 has a center tap 31, which is connected to the primary circuit zero potential and two outer connections 32a, 32b which are connected by diodes 33a, 33b, which form a full-wave rectifier, to the input of a low-pass filter. The low-pass filter consists of an inductance 34 and a capacitance 35 in parallel with which a resistance 36 is connected. At its output, a voltage divider formed by resistances 37, 38 is located from which the voltage controlling the pulse-width modulator 1 is taken. This avoids the pulse-width modulator 1 being connected to the output 4.

This embodiment can be recommended as being especially simple, reliable and cost-effective particularly in those cases where the value of the input voltage at the time of switch-on is accurately known and it is not expected that this value will be significantly exceeded in operation.

The devices, shown in connection with FIG. 2 and FIG. 4 for feedback with isolation, naturally can also be combined with the respective other embodiment of the invention or, if necessary, can also be totally omitted and the output 4 can be connected directly or through an impedance to the pulse-width modulator 1 as in the embodiment of FIG. 1.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

What is claimed is:

1. A switching power-supply unit having a DC-voltage input, which unit is normal operation generates at an output an output voltage which at least approximately corresponds to a rated value, and which includes a pulse-width modulator that is controlled by said output voltage; a first switch which is actuated by said modulator; and, at said output, a low-pass filter including an inductance and a capacitance, the improvement wherein said power-supply unit includes a bypassing circuit which bypasses said inductance, the impedance of said bypassing circuit having an inductive component which is low relative to said inductance, said bypassing circuit being conductive when said output voltage is below a minimum value that is not higher than said rated value of said output voltage, said first switch actuated by said modulator located between the input of said power-supply unit and said low-pass filter, the input of said low-pass filter connected to ground by a free-wheeling diode, said bypassing circuit including a second switch which is actuated by a comparator which compares said output voltage with a reference voltage.

2. A switching power-supply unit according to claim 1, wherein the minimum value of the output voltage, below the threshold of which the bypassing circuit conducts, is at least 60% of said rated value of said output voltage.

3. A switching power-supply unit having a DC-voltage input, which unit is normal operation generates at an output an output voltage which at least approximately corresponds to a rated value, and which includes a pulse-width modulator that is controlled by said output voltage; a first switch which is actuated by said modulator; and, at said output, a low-pass filter including an inductance and a capacitance, the improvement wherein said power supply unit includes a bypassing circuit which bypasses said inductance, the impedance of said bypassing circuit having an inductive component which is low relative to said inductance, said bypassing circuit being conductive when said output voltage is below a minimum value that is not higher than said rated value of said output voltage, said power-supply unit further including a transformer having a primary winding with a center tap connected with the input of said power-supply unit, the first and second terminal ends of said primary winding connected to ground through first and second switches, respectively, said first and second switches actuated by said pulse-width modulator, said transformer further including a secondary winding connected with a full-wave rectifier, the output of which full-wave rectifier is connected with the input of said low-pass filter, said bypassing circuit including a third switch which is actuated by a comparator which compares said output voltage with a reference voltage.

4. A switching power-supply unit according to claim 3, wherein the minimum value of the output voltage, below the threshold of which the bypassing circuit conducts, is at least 60% of said rated value of said output voltage.

5. A switching power-supply unit having a DC-voltage input, which unit in normal operation generates at an output an output voltage which at least approximately corresponds to a rated value, and which includes a pulse-width modulator that is controlled by said output voltage; a first switch which is actuated by said modulator; and, at said output, a low-pass filter including an inductance and a capacitance, the improvement wherein said power-supply unit includes a bypassing circuit which bypasses said inductance, the impedance of said bypassing circuit having an inductive component which is low relative to said inductance, said bypassing circuit being conductive when said output voltage is below a minimum value that is not higher than said rated value of said output voltage, said power-supply unit further including a transformer having a primary winding with a center tap connected with the input of said power-supply unit, the first and second terminal ends of said primary winding connected to ground through first and second switches, respectively, said first and second switches actuated by said pulse-width modulator, said transformer further including a secondary winding having first and second terminals connected with a first full-wave rectifier, the output of which first full-wave rectifier is connected with the input of said low-pass filter, the secondary winding having first and second taps connected between a center tap and the first and second terminals of the secondary winding, respectively, said bypassing circuit including a second full-wave rectifier connected between said first and second taps and said output.

6. A switching power-supply network according to claim 5, wherein the minimum value of the output voltage, below the threshold of which the bypassing circuit conducts, is at least 60% of said rated value of said output voltage.

7. A switching power-supply unit having a DC-voltage input, which unit in normal operation generates at its output an output voltage which at least approximately corresponds to a rated value and which has a pulse-width modulator, which is controlled by the output voltage, and at least one switch which is actuated by this modulator and, at its output, a low-pass filter which is constructed of an inductance and a capacitance, the improvement wherein said power-supply unit includes a bypassing circuit which bypasses the inductance and the impedance of which bypassing circuit has an inductive component which is low in comparison with said inductance, and which conducts if the output voltage is below a minimum value which is not higher than the rated value of the output voltage and is at least 60% of the rated value of the output voltage.

8. A switching power-supply unit having a DC-voltage input, which unit in normal operation generates at its output an output voltage which at least approximately corresponds to a rated value and which has a pulse-width modulator, which is controlled by the output voltage, and at least one switch which is actuated by this modulator and, at its output, a low-pass filter which is constructed of an inductance and a capacitance, the improvement wherein said power-supply unit includes a bypassing circuit which bypasses the inductance and the impedance of which bypassing circuit has an inductive component which is low in comparison with said inductance, and which conducts if the output voltage is is sensed as being below a minimum value which is not higher than the rated value of the output voltage.

9. A switching power-supply unit according to claim 1, 2, 3 or 4, wherein the impedance contained in the bypassing circuit and the switch are constructed as a switchable constant current source.

10. A switching power-supply unit according to claim 9, wherein the switchable constant current source contains a first transistor the emitter of which is connected on the one hand through an emitter resistance and a Zener diode to the base of said first transistor and, on the other hand, through the emitter resistance and a diode to the output of the bypassing circuit and the collector of which first transistor is connected to the input of the bypassing circuit and is connected through a base-collector resistance to the base, and wherein the comparator contains a second transistor and a voltage divider, which is located between the output voltage and ground and which drives the second transistor, the collector of which second transistor is connected to the base of the first transistor and the emitter of which second transistor is grounded through a Zener diode used as reference voltage source.

11. A switching power-supply unit according to claim 3, 4, 5 or 6, wherein the input is isolated from the output.

12. A switching power-supply unit according to claim 11, wherein the secondary winding and the primary winding of the transformer are isolated from each other and the output is connected to the pulse-width modulator through isolating transmission means.

13. A switching power-supply unit according to claim 11, wherein the transformer has a secondary auxiliary winding followed by a full-wave rectifier and a low-pass filter consisting of an inductance and a capacitance, the output of which filter is connected to the pulse-width modulator.

* * * * *